United States Patent
Nakano

(10) Patent No.: US 8,527,786 B2
(45) Date of Patent: Sep. 3, 2013

(54) ELECTRONIC APPARATUS, CONTROL METHOD, AND COMPUTER READABLE RECORDING MEDIUM

(75) Inventor: Katsuya Nakano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 13/074,750

(22) Filed: Mar. 29, 2011

(65) Prior Publication Data

US 2011/0264297 A1     Oct. 27, 2011

(30) Foreign Application Priority Data

Apr. 27, 2010  (JP) ................................ 2010-102688

(51) Int. Cl.
    *G06F 1/00*     (2006.01)
(52) U.S. Cl.
    USPC ....................................................... 713/300
(58) Field of Classification Search
    None
    See application file for complete search history.

(56) References Cited

U.S. PATENT DOCUMENTS

| | | | | |
|---|---|---|---|---|
| 5,831,412 | A * | 11/1998 | Morioka et al. | 320/106 |
| 2004/0233731 | A1 * | 11/2004 | Yaoi et al. | 365/185.33 |
| 2008/0098221 | A1 * | 4/2008 | Hashimoto et al. | 713/169 |
| 2009/0284227 | A1 * | 11/2009 | Mohammadian et al. | 320/137 |

FOREIGN PATENT DOCUMENTS

| | | |
|---|---|---|
| CN | 101685972 A | 3/2010 |
| JP | 11-098706 | 4/1999 |

OTHER PUBLICATIONS

The above reference was cited in a Apr. 22, 2013 Chinese Office Action, which is enclosed with an English Translation, that issued in Chinese Patent Application No. 201110107355.7.

* cited by examiner

*Primary Examiner* — Thomas Lee
*Assistant Examiner* — Zhipeng Wang
(74) *Attorney, Agent, or Firm* — Cowan, Liebowitz & Latman, P.C.

(57) ABSTRACT

An electronic apparatus includes a power receiving unit that receives electric power supplied from the power supply apparatus in a non-contact manner; and a control unit that controls the electronic apparatus to be set in a second state until a predetermined time elapses since identification information is assigned from the power supply apparatus and controls the electronic apparatus to be set in a first state if the predetermined time has elapsed, wherein, if the power supply apparatus detects an electronic apparatus that is set in the first state, the power supply apparatus assigns identification information to the detected electronic apparatus.

20 Claims, 7 Drawing Sheets

| IDENTIFICATION INFORMATION | CHARGE STATE |
|---|---|
| 1 | EXECUTION OF CHARGING |
| 2 | NOT IN USE |
| 3 | NOT IN USE |

ELECTRONIC APPARATUS, CONTROL METHOD, AND COMPUTER READABLE RECORDING MEDIUM

BACKGROUND OF THE INVENTION

1. Field of the Invention

The present invention relates to an electronic apparatus, control method, and computer readable recording medium.

2. Description of the Related Art

In recent years, a charging system in which a power supply apparatus supplies electric power to a power receiving apparatus such as a mobile phone or digital still camera, to which a secondary battery is attached, without any connection via connectors, so as to charge its secondary battery in a non-contact manner, is known. For example, as disclosed in Japanese Patent Laid-Open No. H11-98706, it is known that such charging system charges the secondary battery attached to the power receiving apparatus by an induced electromotive force, which is generated on a secondary coil included in the power receiving apparatus due to a magnetic flux change generated by the power supply apparatus including a primary coil.

In the above charging system, when a plurality of power receiving apparatuses exist within a power receiving range in which they can receive a magnetic flux pattern generated on the primary coil of the power supply apparatus, the power supply apparatus equally and supplies in parallel electric power to the plurality of power receiving apparatuses.

The power supply apparatus transmits a magnetic flux pattern used to supply electric power on which that including a control signal required to control a power receiving apparatus is superposed to a plurality of power receiving apparatuses. Upon reception of this control signal, each power receiving apparatus assigns identification information included in the control signal transmitted from the power supply apparatus as that corresponding to itself. For this reason, the power supply apparatus selects one of the plurality of power receiving apparatuses using the identification information assigned to the power receiving apparatus, and individually controls to charge the selected power receiving apparatus.

However, in the aforementioned charging system, when a plurality of power receiving apparatuses are simultaneously placed within the power receiving range, since they simultaneously receive the control signal transmitted from the power supply apparatus, the same identification information is assigned to the plurality of power receiving apparatuses. That is, even when the power supply apparatus selects one of the plurality of power receiving apparatuses as a power supply target using the identification information, the plurality of power receiving apparatuses assigned with the same identification information are selected as power supply targets. For this reason, the power supply apparatus cannot often individually control to charge the plurality of power receiving apparatuses which are detected to simultaneously exist within the power receiving range.

SUMMARY OF THE INVENTION

The present invention has been made in consideration of the problems of the related art. The present invention provides a technique for preventing the same identification information from being assigned to a plurality of power receiving apparatuses in a charging system in which a power supply apparatus charges a plurality of power receiving apparatuses in a non-contact manner.

The present invention in its first aspect provides an electronic apparatus for receiving electric power from a power supply apparatus in a non-contact manner, the electronic apparatus comprising: a power receiving unit that receives electric power supplied from the power supply apparatus; and a control unit that controls the electronic apparatus to be set in a second state until a predetermined time elapses since identification information is assigned from the power supply apparatus, wherein, if the power supply apparatus detects an electronic apparatus that is set in a first state, the power supply apparatus assigns identification information to the detected electronic apparatus, the control unit controls the electronic apparatus to be set in the first state if the predetermined time has elapsed, the control unit controls to store the identification information assigned from the power supply apparatus in a recording unit, the first state is a state in which the power receiving unit receives the electric power supplied from the power supply apparatus, and the second state is a state in which the power receiving unit does not receive the electric power supplied from the power supply apparatus.

Further features of the present invention will become apparent from the following description of exemplary embodiments (with reference to the attached drawings).

DESCRIPTION OF THE EMBODIMENTS

Figure 1A:
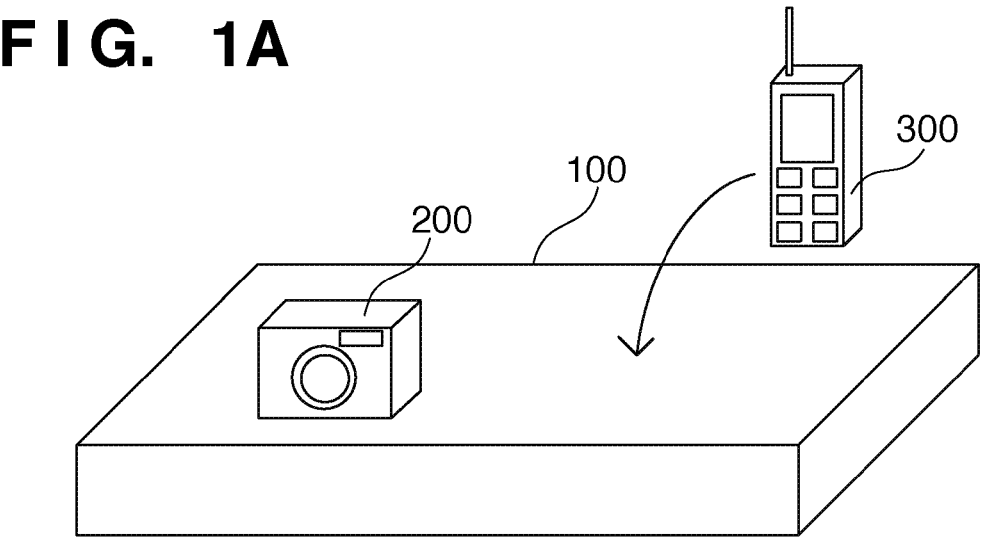
FIGS. 1A, 1B, and 1C are views showing an example of a charging system according to the first embodiment.
Figure 1B:
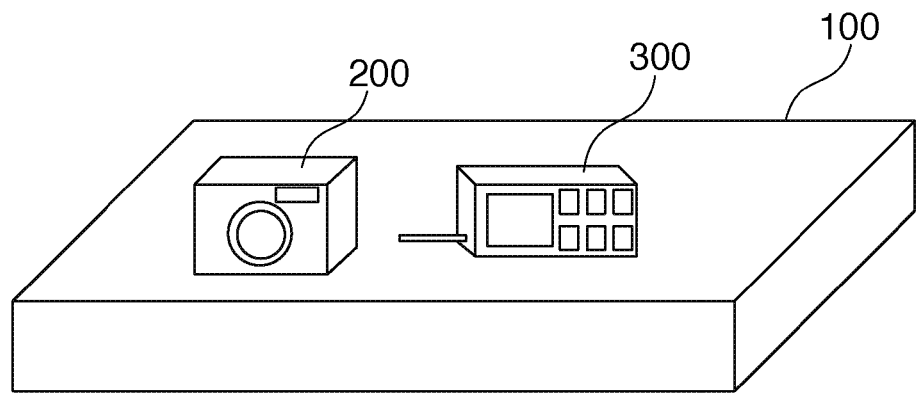
Figure 1C:
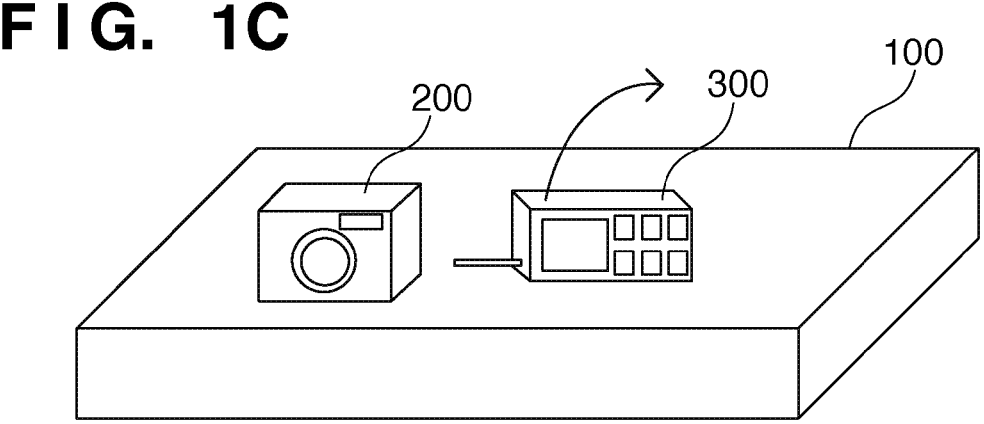

An embodiment of the present invention will be described in detail hereinafter with reference to the drawings. A charging system according to the first embodiment has a power supply apparatus 100, and first and second power receiving apparatuses 200 and 300, as shown in FIGS. 1A, 1B, and 1C.

First Embodiment

The first power receiving apparatus 200 can attach a detachable secondary battery (not shown). The first power receiving apparatus 200 is an electronic apparatus which operates based on electric power supplied from the attached secondary battery, and charges the attached secondary battery by electric power supplied from the power supply apparatus 100. Likewise, the second power receiving apparatus 300 is an electronic apparatus which operates based on electric power supplied from an attached secondary battery (not shown), and charges the attached secondary battery by electric power supplied from the power supply apparatus 100. The first and second power receiving apparatuses 200 and 300 receive electric powers which are required to charge their secondary batteries and are supplied from the power supply apparatus 100.

Note that the power supply apparatus 100 according to the first embodiment has a primary coil, and generates a magnetic flux pattern on the primary coil. Also, each of the first and second power receiving apparatuses 200 and 300 according to the first embodiment has a secondary coil, and generates an induced electromotive force on the secondary coil due to a change in magnetic flux pattern generated by the power supply apparatus 100.

Note that the following description will be given while exemplifying a power supply station 100 as the power supply apparatus 100, exemplifying a digital still camera 200 as the first power receiving apparatus 200 (the digital still camera 200 will be referred to as "camera 200" hereinafter), and exemplifying a mobile phone 300 as the second power receiving apparatus 300. Note that the charging system according to the first embodiment may be other than the system in which the power supply station 100 charges the first and second power receiving apparatuses 200 and 300 using an induced electromotive force generated by electromagnetic induction. The charging system according to the first embodiment can be a system in which a power supply apparatus supplies electric powers to power receiving apparatuses in a non-contact manner, and the power receiving apparatuses charge their secondary batteries by the electric powers supplied from the power supply apparatus. For example, the power supply apparatus 100 may charge the first and second power receiving apparatuses 200 and 300 using an electromotive force generated by magnetic field resonance.

Note that when the power supply apparatus 100 supplies an electric power to the first power receiving apparatus 200 by magnetic field resonance in a non-contact manner in the charging system, the power supply apparatus 100 has an AC power supply, driven element, and resonance element, and the first power receiving apparatus 200 has a rectification circuit, driven element, and resonance element. Each of the driven elements and resonance elements of the power supply apparatus 100 and first power receiving apparatus 200 is configured by an air core coil. The driven elements and resonance elements of the power supply apparatus 100 and first power receiving apparatus 200 are coupled by electromagnetic induction. Also, when the resonance frequency of the resonance element of the power supply apparatus 100 matches that of the resonance element of the first power receiving apparatus 200, these resonance elements have a magnetic field resonance relationship, and the power supply apparatus 100 controls the AC power supply so that the resonance elements of the power supply apparatus 100 and first power receiving apparatus 200 have a magnetic field resonance relationship.

In this case, an AC current is supplied from the resonance element of the power supply station 100 to that of the first power receiving apparatus 200 at the resonance frequency in a non-contact manner, and a current is supplied from the resonance element of the first power receiving apparatus 200 to the driven element by the electromagnetic induction and is converted into a DC current by the rectification circuit. Thus, the power supply apparatus 100 supplies electric power to the first power receiving apparatus 200 by the magnetic field resonance in a non-contact manner, and the first power receiving apparatus 200 charges its secondary battery by the electric power supplied by the magnetic field resonance.

Note that the first and second power receiving apparatuses 200 and 300 are not limited to a digital still camera and mobile phone, and they may be electronic apparatuses such as a video camera and music player as long as they operate based on electric power supplied from a secondary battery.

When the camera 200 and mobile phone 300 exist within a power supply range, the power supply station 100 according to the first embodiment can charge the camera 200 and mobile phone 300 by transmitting a magnetic flux pattern. Note that the power supply range is a predetermined range in which the camera 200 and mobile phone 300 can receive a magnetic flux pattern from the power supply station 100. When the camera 200 and mobile phone 300 exist within the power supply range, they can charge their secondary batteries by an induced electromotive force generated by the magnetic flux pattern received from the power-supply station 100.

When neither the camera 200 nor the mobile phone 300 exists within the power supply range, the power supply station 100 cannot charge them even when it transmits a magnetic flux pattern. For this reason, when neither the camera 200 nor the mobile phone 300 exists within the power supply range, they cannot charge their secondary batteries.

In the first embodiment, the following description will be given with reference to FIGS. 1A, 1B, and 1C under the assumption that when the user places the camera 200 and mobile phone 300 on the power supply station 100, they exist within the power supply range. Note that when the user removes the camera 200 and mobile phone 300 from the power supply station 100, they do not exist within the power supply range.

Figure 2:
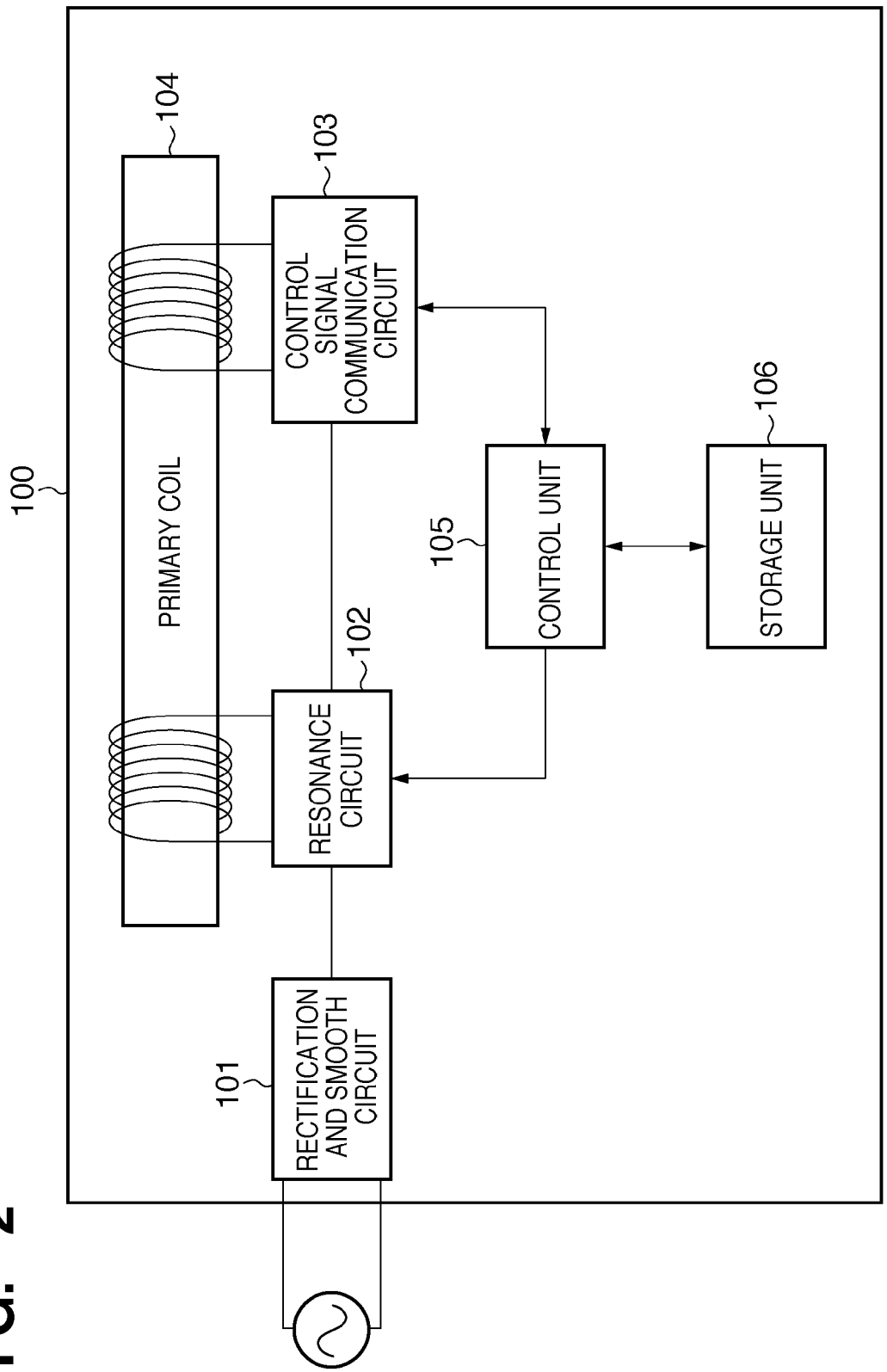
FIG. 2 is a block diagram showing an example of the arrangement of a power supply apparatus according to the first embodiment.

FIG. 2 is a block diagram showing the arrangement of the power supply station 100 according to the first embodiment of the present invention.

The power supply station 100 includes a rectification and smooth circuit 101, resonance circuit 102, control signal communication circuit 103, primary coil 104, control unit 105, and storage unit 106.

The rectification and smooth circuit 101 converts an input AC voltage into a DC voltage, and removes pulsing components included in the converted DC voltage. The DC voltage converted by the rectification and smooth circuit 101 is supplied to the resonance circuit 102.

The resonance circuit 102 oscillates a high frequency required to generate a power supply magnetic flux pattern (to be referred to as "first magnetic flux pattern" hereinafter) corresponding to a target value decided by the control unit 105. The target value includes, for example, a current value required for the power supply station 100 to charge the camera 200 and mobile phone 300, or a voltage value required to charge the camera 200 and mobile phone 300. Also, the resonance circuit 102 detects a power consumption consumed when the power supply station 100 transmits the first magnetic flux pattern to the camera 200 and mobile phone 300. The control unit 105 can determine in accordance with a variation of power consumption detected by the resonance circuit 102 that at least one of the camera 200 and mobile phone 300 exists on the power supply station 100.

In order to cause the primary coil 104 to generate a communication magnetic flux pattern (to be referred to as "second magnetic flux pattern" hereinafter), which is different from the first magnetic flux pattern and is required to transmit a control signal (to be referred to as "command" hereinafter), the control signal communication circuit 103 oscillates a frequency based on the command in accordance with a predetermined protocol.

The primary coil 104 can generate the second magnetic flux pattern by oscillations of the resonance circuit 102 and control signal communication circuit 103. Assume that the second magnetic flux pattern generated by the primary coil 104 is output in a direction perpendicular to the power supply station 100. Note that the second magnetic flux pattern includes a command.

The second magnetic flux pattern generated on the primary coil 104 by the control signal communication circuit 103 will be described below. The second magnetic flux pattern is transmitted to the camera 200 and mobile phone 300 while being superposed on the first magnetic flux pattern. A command includes a preamble, destination identification information, and command code. The command included in the second magnetic flux pattern is generated when the control signal communication circuit 103 oscillates a frequency required to cause the primary coil 104 to generate excitations of a given strength. The generated command is transmitted to the camera 200 and mobile phone 300 as pulse signals. The transmitted pulse signals are recognized by the camera 200 and mobile phone 300 as bit data including information of "1" and "0". The camera 200 and mobile phone 300 recognize the command by analyzing the pulse signals as the bit data.

The control unit 105 is, for example, a CPU, which reads out operation programs of the respective blocks of the power supply station 100, which are stored in the storage unit 106, and controls the operations of the respective blocks. The control unit 105 has a timer (not shown) which measures an elapsed time period since each block starts an operation.

The storage unit 106 is a rewritable nonvolatile memory, and stores information such as parameters required for the operations of the respective blocks in addition to the operation programs of the respective blocks included in the power supply station 100. Also, the storage unit 106 stores an identification information management table which is used to manage the camera 200 and mobile phone 300 placed on the power supply station 100.

Figures 3, 4:
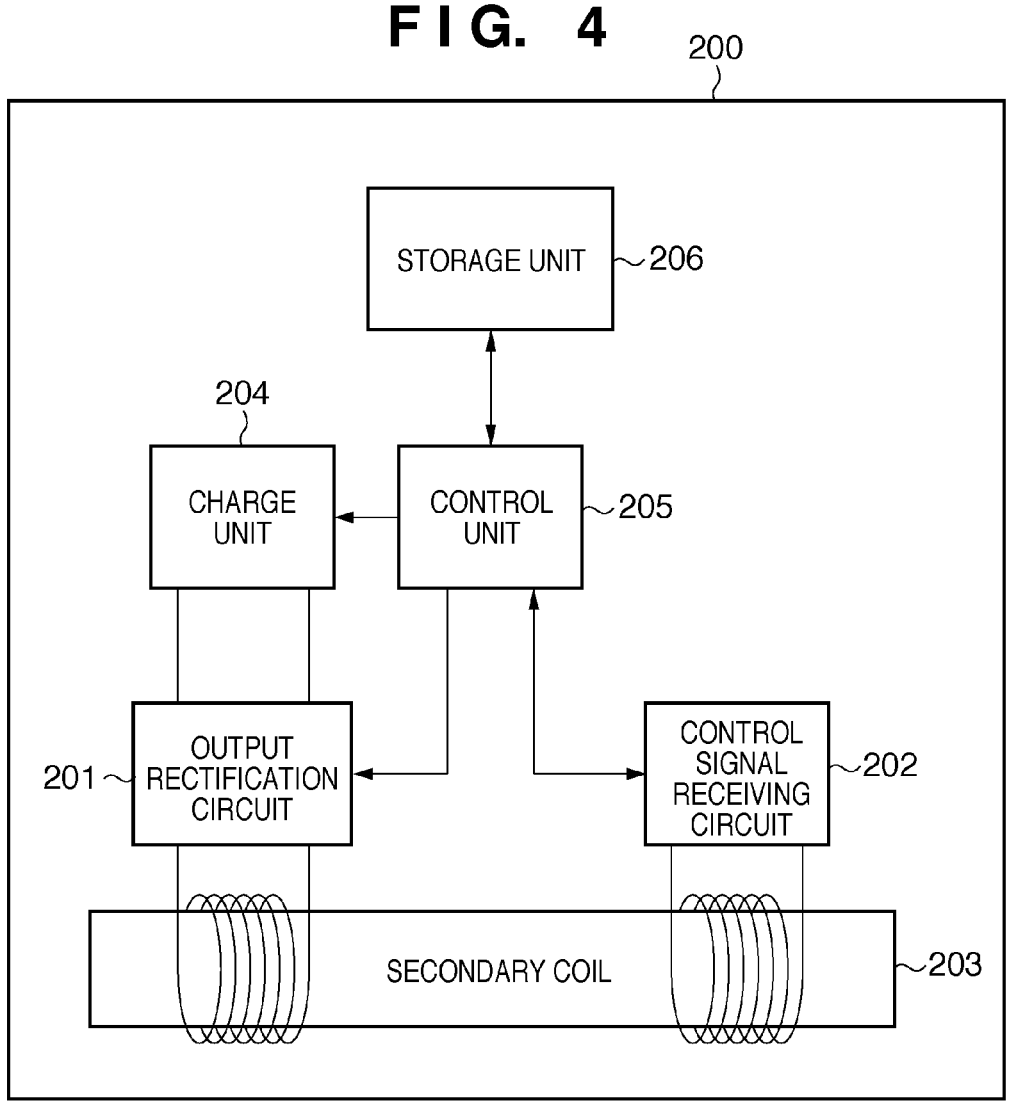
FIG. 3 shows an example of an identification information management table according to the first embodiment.
FIG. 4 is a block diagram showing an example of the arrangement of a power receiving apparatus according to the first embodiment.

FIG. 3 shows an example of the identification information management table stored in the storage unit 106. The identification information management table manages identification information used to manage a power receiving apparatus which exists within a power receiving range, and a charge state of the power receiving apparatus assigned that identification information. Note that the identification information used to manage the power receiving apparatus which exists within the power receiving range is information which is assigned by the control unit 105 to the camera 200 and mobile phone 300. The charge state of the power receiving apparatus in the identification information management table includes three states, that is, "execution of charging", "stop charging", and "not in use". "Execution of charging" indicates a state of a power receiving apparatus from when the power supply station 100 transmits a charge start command which instructs to start charging to the power receiving apparatus assigned the identification information until it transmits a charge stop command which instructs to stop charging to the power receiving apparatus. "Stop charging" is a state of a power receiving apparatus when the power supply station 100 transmits the charge stop command. "Not in use" is a state of a power receiving apparatus to which the power supply station 100 does not assign any identification information.

The following description will be given under the assumption that when the camera 200 and mobile phone 300 are placed on the power supply station 100, they exist within the power receiving range of the power supply station 100.

FIG. 4 is a block diagram showing the arrangement of the camera 200 according to the first embodiment of the present invention. The camera 200 has an output rectification circuit 201, control signal receiving circuit 202, secondary coil 203, charge unit 204, control unit 205, and storage unit 206.

The output rectification circuit 201 generates a charge DC electric power from the first magnetic flux pattern obtained by removing the superposed second magnetic flux pattern and noise from an induced electromotive force generated on the secondary coil 203, and supplies it to the charge unit 204.

The control signal receiving circuit 202 detects components of the second magnetic flux pattern transmitted from the power supply station 100 from the induced electromotive force generated on the secondary coil 203, and analyzes the second magnetic flux pattern according to the protocol of the command. The control signal receiving circuit 202 outputs the analysis result of the command analyzed from the second magnetic flux pattern to the control unit 205.

When the camera 200 exists on the power supply station 100 in a power receiving state, an induced electromotive force is generated on the secondary coil 203 by a change in first magnetic flux pattern generated by the primary coil 104 of the power supply station 100.

The charge unit 204 supplies the DC electric power supplied from the output rectification circuit 201 to a secondary battery (not shown) attached to the camera 200, thereby charging the secondary battery (not shown). Also, the charge unit 204 calculates the remaining capacity of the secondary battery attached to the camera 200, and supplies it to the control unit 205.

The control unit 205 is, for example, a CPU, which controls the operations of respective blocks by reading out and executing operation programs of the respective blocks of the camera 200, which are stored in the storage unit 206.

The control unit 205 compares identification information included in the destination identification information of the second magnetic flux pattern received by the control signal receiving circuit 202 with that of the camera 200 stored in the storage unit 206. When the identification information included in the destination identification information matches that of the camera 200 stored in the storage unit 206, the control unit 205 determines that the received command is an operation instruction to the camera 200. In this case, the control unit 205 executes an operation designated by the command code. When the identification information included in the destination identification information does not match that of the camera 200 stored in the storage unit 206, the control unit 205 does not execute any operation designated by the command code. The identification information of the camera 200 stored in the storage unit 206 is that assigned by the power supply station 100.

Also, the control unit 205 determines whether or not the secondary battery (not shown) connected to the camera 200 is fully charged, based on the remaining capability of the secondary battery supplied from the charge unit 204. Upon execution of charging, when the secondary battery (not shown) attached to the camera 200 is fully charged, the control unit 205 changes the state of the camera 200 to a power receiving stopped state. When the user operates to charge the camera 200, and the secondary battery (not shown) is not fully charged, the control unit 205 changes the state of the camera 200 to a power receiving state. In the power receiving stopped state, even when the first magnetic flux pattern generated by the primary coil 104 of the power supply station 100 causes the secondary coil 203 to generate an induced electromotive force, the output rectification circuit 201 is controlled not to supply any electric power to the charge unit 204. That is, in the power receiving stopped state, the control unit 205 controls not to operate the output rectification circuit 201. In this case, since no induced electromotive force is supplied to the charge unit 204, the charge unit 204 cannot charge the secondary battery (not shown). In the power receiving state, an induced electromotive force generated on the secondary coil 203 based on the first magnetic flux pattern generated by the primary coil 104 of the power supply station 100 charges the secondary battery (not shown). When the camera 200 is in the power receiving state, it can receive the first and second magnetic flux patterns.

The control unit 205 has a timer (not shown), and measures, for example, a time period elapsed since assignment of the identification information from the power supply station 100 to the camera 200. Also, the control unit 205 has a counter (not shown), and counts, for example, the number of times of assignment of the identification information from the power supply station 100.

The storage unit 206 is a rewritable nonvolatile memory, and stores the identification information of the camera 200 in addition to the operation programs of the respective blocks of the camera 200. Also, the storage unit 206 stores a threshold for the time period elapsed since assignment of the identification information, which time period is measured by the timer of the control unit 205, and the number of times of assignment of the identification information, which is counted by the counter of the control unit 205.

Note that the camera 200 further includes an image capturing unit which generates image data such as a still image or moving image by capturing an image of an object, and records the generated image data in the storage unit 206 or an external recording medium.

Note that the mobile phone 300 includes an output rectification circuit 301, control signal receiving circuit 302, secondary coil 303, charge unit 304, control unit 305, and storage unit 306. The arrangements and operations of the output rectification circuit 301, control signal receiving circuit 302, secondary coil 303, charge unit 304, control unit 305, and storage unit 306 are the same as those of the arrangements included in the camera 200. For this reason, a description about the mobile phone 300 will not be given.

(Identification Information Assignment Process)

Identification information assignment process executed by the power supply station 100 in the first embodiment will be described below with reference to the flowchart of FIG. 5. The identification information assignment process can be executed when the control unit 105 executes a program stored in the storage unit 106. Note that the identification information assignment process shown in FIG. 5 will be described below taking as an example a case in which the mobile phone 300 is placed on the power supply station 100, as shown in FIG. 1B, in a state in which the camera 200 exists on the power supply station 100, as shown in FIG. 1A. Note that the camera 200 and mobile phone 300 are set in the power receiving state at that time. Note that the following description will be given under the assumption that the identification information assignment process is started when, for example, the user turns on the power switch of the power supply station 100. Also, even when the power supply station 100 cannot specify, for example, models or product names of power receiving apparatuses placed on the power supply station 100, it can assign identification information to the camera 200 and mobile phone 300 by the identification information assignment process. For this reason, in the identification information assignment process, in order to clarify a power receiving apparatus to which the power supply station 100 applies the identification information assignment process, when a target of the process to be executed by the control unit 105 is a power receiving apparatus, the following description will be given while specifying the camera 200 or mobile phone 300.

In step S501, the control unit 105 controls the resonance circuit 102 to transmit the first magnetic flux pattern generated on the primary coil 104 to power receiving apparatuses (camera 200 and mobile phone 300) placed on the power supply station 100. The control unit 105 decides the target value of the first magnetic flux pattern, and controls the resonance circuit 102 to cause the primary coil 104 to generate the first magnetic flux pattern corresponding to the decided target value. When the control unit 105 controls the resonance circuit 102 to transmit the first magnetic flux pattern to the camera 200 and mobile phone 300, it advances the process to step S502.

The control unit 105 determines in step S502 whether or not a power consumption detected by the resonance circuit 102 is increased by a predetermined value or more. When the mobile phone 300 is newly placed on the power supply station 100 from the state shown in FIG. 1A, as shown in FIG. 1B, the power consumption detected by the resonance circuit 102 is increased by the predetermined value or more. This is because the output rectification circuit 301 supplies an induced electromotive force generated on the secondary coil 303 of the mobile phone 300 to the charge unit 304, which begins to charge the secondary battery (not shown). That is, the resonance circuit 102 detects a power consumption more than that before the mobile phone 300 is placed on the power supply station 100.

When the power consumption detected by the resonance circuit 102 is increased by the predetermined value or more, the control unit 105 determines that at least one of the secondary coils 203 and 303 charges the secondary battery by an induced electromotive force generated due to the first magnetic flux pattern transmitted from the primary coil 104. Thus, the control unit 105 determines whether or not a new power receiving apparatus is placed on the power supply station 100 by checking whether or not the power consumption detected by the resonance circuit 102 is increased by the predetermined value or more.

When the power consumption is increased by the predetermined value or more, the control unit 105 determines that, for example, the mobile phone 300 newly exists on the power supply station 100, and advances the process to step S503. Note that the power receiving apparatus which is determined to exist on the power supply station 100 in step S502 is that which is not registered in the identification information management table. When the power consumption is not increased by the predetermined value or more, the control unit 105 ends the identification information assignment process.

In step S503, the control unit 105 acquires unused identification information with reference to the identification information management table stored in the storage unit 106. When the identification information management table is as shown in FIG. 3, the control unit 105 acquires pieces of unused identification information "2" and "3" in step S503. When the pieces of unused identification information are acquired, the control unit 105 advances the process to step S504.

In step S504, the control unit 105 selects one identification information "2" of the pieces of unused identification information "2" and "3", and assigns the selected identification information "2" to the mobile phone 300 detected in step S502. The control unit 105 controls the control signal communication circuit 103 to generate an identification information assignment command used to assign the selected identification information "2" to the mobile phone 300 to which no identification information is assigned. In order to assign the identification information "2" to the power receiving apparatus to which no identification information is assigned, the control unit 105 generates an identification information assignment command including destination identification information for the power receiving apparatus to which no identification information is assigned. Furthermore, the control unit 105 controls the primary coil 104 to generate a second magnetic flux pattern including the identification information assignment command generated by the control signal communication circuit 103. The second magnetic flux pattern generated by the control signal communication circuit 103 is superposed on the first magnetic flux pattern generated by the resonance circuit 102, and is transmitted to the mobile phone 300 detected in step S502.

When the second magnetic flux pattern including the identification information assignment command is transmitted to the mobile phone 300, the control unit 105 advances the process to step S505.

Since the control unit 105 assigns the identification information "2" to the mobile phone 300, which is detected in step S502, in step S504, it updates the charge state of the mobile phone 300 in the identification information management table stored in the storage unit 106 in step S505.

When the control unit 105 transmits a charge start command used to instruct to start charging to the mobile phone 300 assigned the identification information "2", it changes the charge state corresponding to the identification information "2" in the identification information management table to "execution of charging". Also, when the control unit 105 does not transmit any charge stop command used to stop charging to the mobile phone 300 assigned the identification information "2", it changes the charge state corresponding to the identification information "2" in the identification information management table to "execution of charging".

Note that when the control unit 105 transmits the charge stop command used to instruct to stop charging to the mobile phone 300 assigned the identification information "2", it changes the charge state corresponding to the identification information "2" in the identification information management table to "stop charging".

In this way, the charge information of each of the camera 200 and mobile phone 300, which exist on the power supply station 100, in the identification information management table stored in the storage unit 106 is updated. Note that the identification information assignment process is repetitively executed while the power switch of the power supply station 100 is kept ON.

Figure 5:
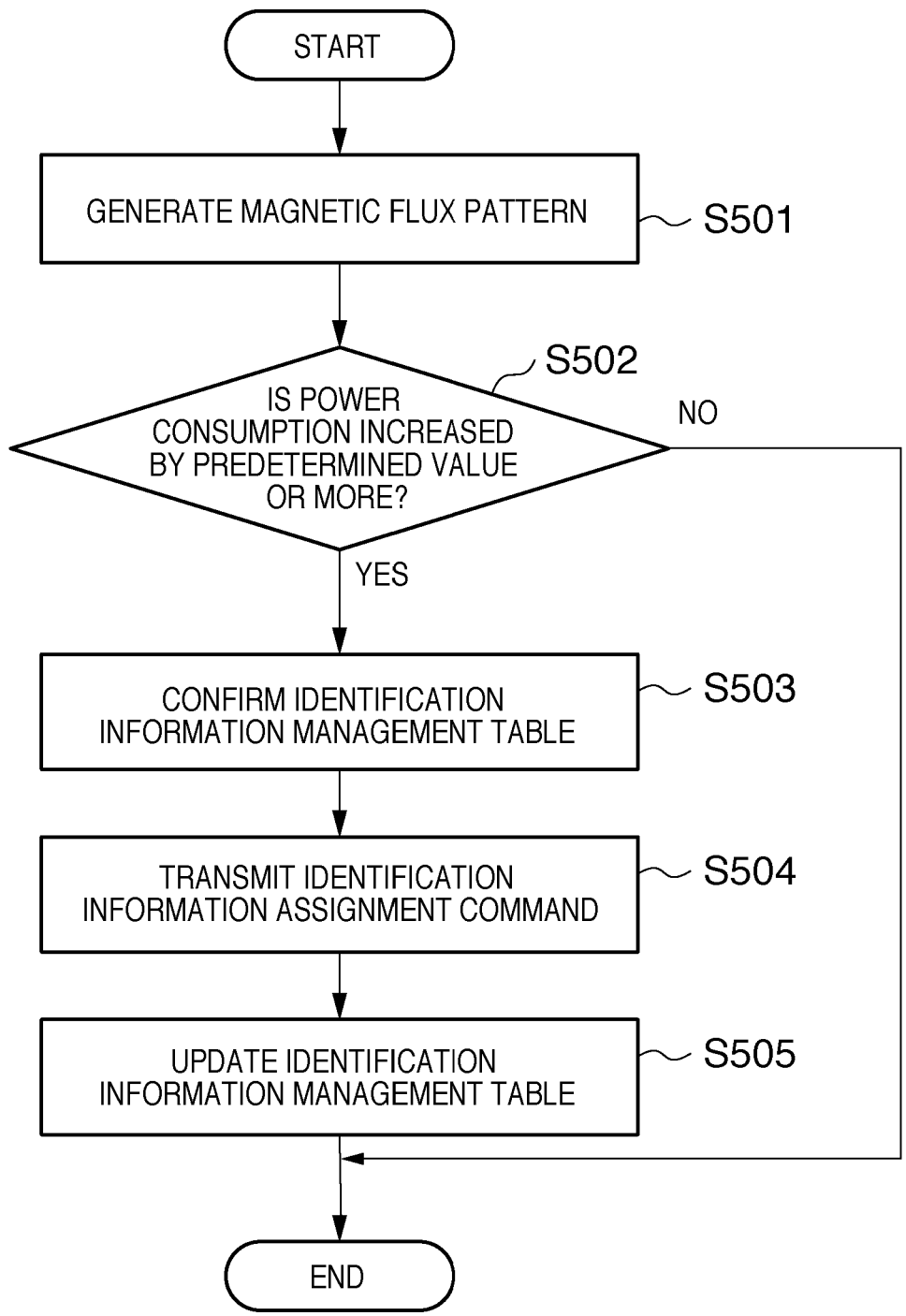
FIG. 5 is a flowchart showing identification information assignment process executed by the power supply apparatus according to the first embodiment.

Likewise, when the camera 200 is newly placed on the power supply station 100 in a state in which the mobile phone 300 exists on the power supply station 100, the power supply station 100 executes the identification information assignment process shown in FIG. 5.

(Identification Information Receiving Process)

When the camera 200 and mobile phone 300 are simultaneously placed on the power supply station 100, and the power supply station 100 executes the aforementioned identification information assignment process, the camera 200 and mobile phone 300 are detected as one power receiving apparatus.

For this reason, the power supply station 100 undesirably assigns the same identification information to the camera 200 and mobile phone 300 detected as one power receiving apparatus.

In such case, for example, even when the power supply station 100 controls to stop charging of the camera 200, since the mobile phone 300 and camera 200 have the same identification information, it poses a unwanted problem that stops charging of the mobile phone 300.

When the aforementioned problem has occurred, the power supply station 100 cannot determine whether or not the same identification information is assigned to the camera 200 and mobile phone 300. For this reason, the power supply station 100 cannot individually control the plurality of power receiving apparatuses which are once assigned the same identification information.

To solve the aforementioned problem, the camera 200 executes the identification information receiving process to be described below, so that the power supply station 100 independently assigns pieces of different identification information to the camera 200 and mobile phone 300 assigned the same identification information. Then, the camera 200 and mobile phone 300 assigned the same identification information can be independently controlled by the power supply station 100.

Figure 6:
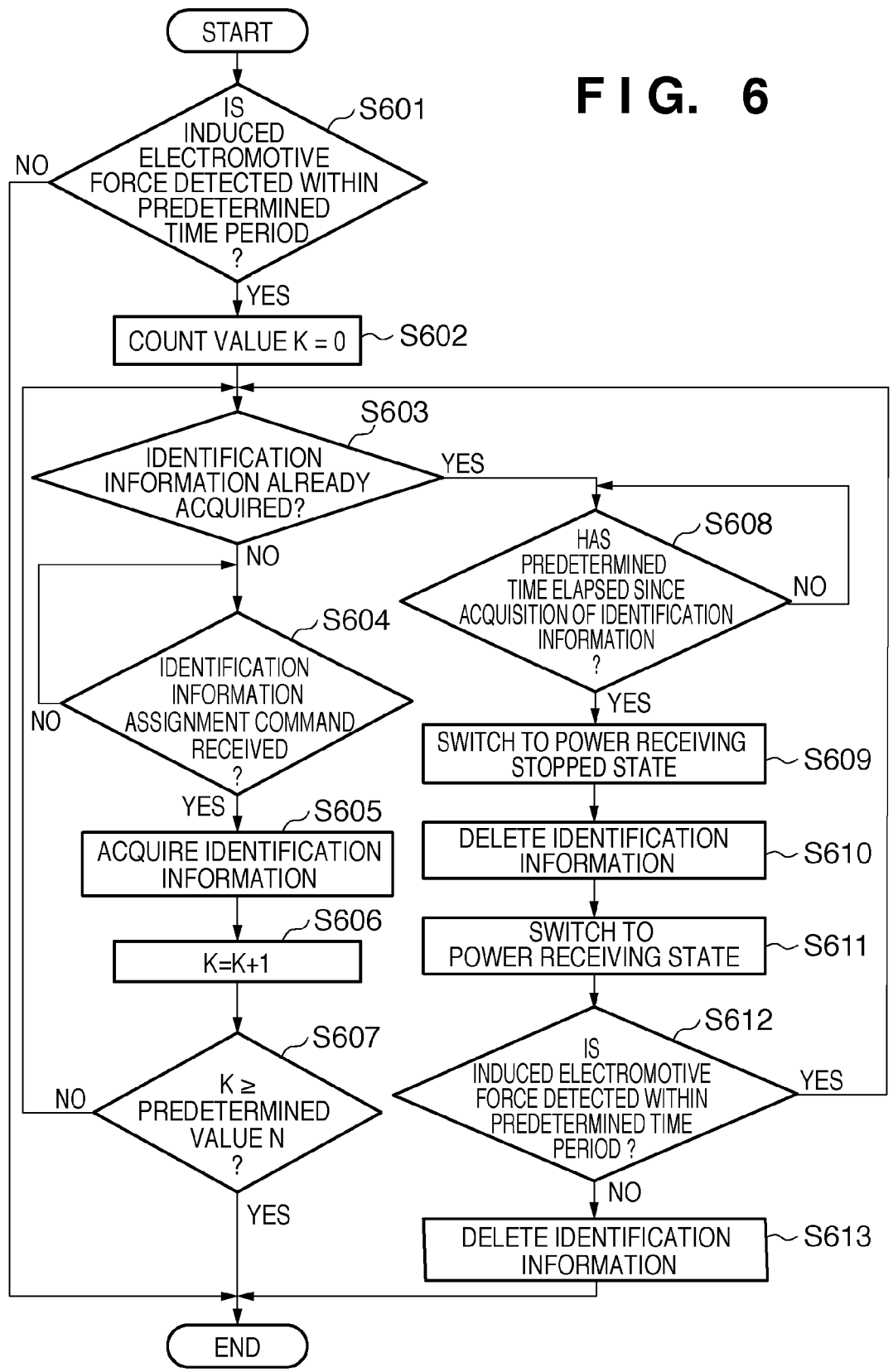
FIG. 6 is a flowchart showing identification information receiving process executed by the power receiving apparatus according to the first embodiment.

The identification information receiving process executed by the camera 200 as the power receiving apparatus in the first embodiment will be described below with reference to the flowchart of FIG. 6. The identification information receiving process can be executed when the control unit 205 reads out and executes a corresponding process program stored in the storage unit 206. The identification information receiving process shown in FIG. 6 will be described below taking as an example a case in which the camera 200 and mobile phone 300 are placed on the power supply station 100, as shown in FIG. 1B.

Note that the following description will be given under the assumption that the identification information receiving process is started when the camera 200 is set in the power receiving state.

The control unit 205 determines in step S601 whether or not the user places the camera 200 on the power supply station 100. More specifically, the control unit 205 determines whether or not the output rectification circuit 201 detects an induced electromotive force generated on the secondary coil 203. When the output rectification circuit 201 detects the induced electromotive force generated based on the first magnetic flux pattern generated by the power supply station 100, the control unit 205 determines that the camera 200 is placed on the power supply station 100, and advances the process to step S602.

When the camera 200 is in the power receiving state, the induced electromotive force generated on the secondary coil 203 is rectified by the output rectification circuit 201, and is then supplied to the charge unit 204. At this time, the induced electromotive force is converted into DC electric power by the output rectification circuit 201. The charge unit 204 begins to charge the secondary battery of the camera 200 using the supplied DC electric power. On the other hand, when no induced electromotive force is detected within a predetermined time period, the control unit 205 ends the identification information receiving process.

In step S602, the control unit 205 resets a count value K stored in the storage unit 206 to zero. When the count value K=0, the control unit 205 advances the process to step S603. Note that this count value K indicates the number of times when the camera 200 acquires identification information from the power supply station 100. The count value K is counted by a counter (not shown) included in the control unit 205. Assume that the count value K is stored in the storage unit 206.

The control unit 205 determines in step S603 whether or not identification information used to identify the camera 200 as a power supply target apparatus is assigned from the power supply station 100, and is stored in the storage unit 206. When the identification information is stored in the storage unit 206, the control unit 205 advances the process to step S608. On the other hand, when no identification information is stored in the storage unit 206, the control unit 205 advances the process to step S604.

In step S604, the control unit 205 repeats the process in step S604 until the identification information is assigned from the power supply station 100. More specifically, when the control signal receiving circuit 202 determines that a command (second magnetic flux pattern) is superposed on the induced electromotive force generated on the secondary coil 203, the control unit 205 controls the control signal receiving circuit 202 to analyze information included in the superposed command. When it is determined that the analyzed command is an identification information assignment command for a power receiving apparatus which is not assigned any identification information, the control unit 205 advances the process to step S605.

Note that when the control signal receiving circuit 202 determines that no identification information assignment command is received after an elapse of a predetermined time period, the control unit 205 may end the identification information receiving process.

In step S605, the control unit 205 acquires identification information included in the identification information assignment command analyzed by the control signal receiving circuit 202. Then, the control unit 205 stores the acquired identification information in the storage unit 206 as that of the camera 200. When the identification information of the camera 200 is recorded in the storage unit 206, the control unit 205 advances the process to step S606. When the power supply station 100 transmits the identification information assignment command to the camera 200, it can assign identification information to the camera 200 when the processes in steps S604 and S605 are executed in the camera 200.

In step S606, the control unit 205 increments the count value K recorded in the storage unit 206 by "1". This is because the control unit 205 acquires the identification information of the camera 200 from the power supply station 100 in step S605. When the count value K is incremented, the control unit 205 advances the process to step S607.

In step S607, the control unit 205 compares the count value K recorded in the storage unit 206 with a predetermined value N. Then, the control unit 205 determines whether or not the number of times of acquisition of identification information from the power supply station 100 reaches a predetermined value.

Assume that the predetermined value N=2 in the first embodiment. This is because the first identification information acquired by the camera 200 from the power supply station 100 is more likely to be the same as that of the mobile phone 300, which was assigned from the power supply station 100 when the camera 200 was placed simultaneously with the mobile phone 300. For this reason, the camera 200 stores the second identification information acquired from the power supply station 100 as that of the camera 200 in the storage unit 206, thereby storing identification different from that of the mobile phone 300 as that of the camera 200 in the storage unit 206.

When the count value K recorded in the storage unit 206 is equal to or larger than the predetermined value N, the control unit 205 ends the identification information receiving process. When the count value K recorded in the storage unit 206 is smaller than the predetermined value N, the control unit 205 returns the process to step S603.

The control unit 205 determines in step S608 whether or not an elapsed time period elapsed since assignment of the identification information by means of the identification information assignment command has reached a predetermined time period T. Note that the elapsed time period is measured by the timer (not shown) after the identification information is recorded in the storage unit 206. When the elapsed time period has reached the predetermined time period T, the control unit 205 advances the process to step S609. When the elapsed time period has not reached the predetermined time period T yet, the control unit 205 repetitively executes the process in step S608. The predetermined time period T compared in step S608 is a time period unique to the camera 200, and it may be, for example, a value which is set in advance in the camera 200 and is stored in the storage unit 206. Alternatively, the predetermined time period T in step S608 may be a value which is randomly generated when the camera 200 acquires identification information from the power supply station 100. The time period unique to the camera 200 may be generated based on, for example, a unique number such as a MAC address of the camera 200 according to a specific rule.

In step S609, the control unit 205 changes the state of the camera 200 to a power receiving stopped state, and controls the charge unit 204 to stop charging on the secondary battery (not shown). More specifically, the control unit 205 controls the output rectification circuit 201 not to rectify the detected induced electromotive force, so as not to supply any electric power from the output rectification circuit 201 to the charge unit 204, thereby stopping charging on the battery of the camera 200. When the charge unit 204 stops charging on the secondary battery, the control unit 205 advances the process to step S610.

In step S610, the control unit 205 deletes the identification information of the camera 200 stored in the storage unit 206. After the identification information of the camera 200 stored in the storage unit 206 is deleted, the control unit 205 advances the process to step S611.

In step S611, the control unit 205 controls the output rectification circuit 201 to supply a DC voltage converted from the induced electromotive force to the charge unit 204, thus restoring the state of the camera 200 to the power receiving state. When the state of the camera 200 is changed to the power receiving state, the control unit 205 advances the process to step S612.

Note that by the processes in steps S609 to S611 executed by the control unit 205, the state of the camera 200 changes from the power receiving state to the power receiving stopped state, and then from the power receiving stopped state to the power receiving state. As a result, the camera 200 allows the power supply station 100 to recognize that charging of the power receiving apparatus (camera 200) placed on the power supply station 100 is complete, and the new power receiving apparatus (camera 200) is placed on the power supply station 100. The control unit 205 determines in step S612 whether or not an induced electromotive force is detected within a predetermined time period after the state of the camera 200 is switched to the power receiving state, as in step S601. When the induced electromotive force is detected in step S612, the control unit 205 returns the process to step S603.

When no induced electromotive force is detected even after an elapse of the predetermined time period in step S612 while the camera 200 is set in the power receiving state, the control unit 205 advances the process to step S613. In step S613, when the identification information of the camera 200 is recorded in the storage unit 206, the control unit 205 deletes the identification information of the camera 200 from the storage unit 206. In this case, the control unit 205 ends the identification information receiving process. Note that when the identification information of the camera 200 is not recorded in the storage unit 206, the control unit 205 may skip the process in step S613 and may end the identification information receiving process.

As described above, in the first power receiving apparatus according to the first embodiment, after an elapse of the predetermined time period T since assignment of identification information (for example, identification information "1"), the state of the first power receiving apparatus is switched to the power receiving stopped state to delete the identification information (identification information "1"). Furthermore, in the first power receiving apparatus, the state of the first power receiving apparatus is changed from the power receiving stopped state to the power receiving state again.

In this way, when the power supply apparatus according to the first embodiment detects based on a change in power consumption that the state of the first power receiving apparatus is changed from the power receiving stopped state to the power receiving state, it transmits new identification information (for example, identification information "2") to the first power receiving apparatus.

For this reason, even when the power supply apparatus assigns the same identification information "1" to the first and second power receiving apparatuses, since it transmits new identification information "2" to the first power receiving apparatus again, the first power receiving apparatus acquires the new identification information "2" from the power supply apparatus. In this case, when the second power receiving apparatus detects an induced electromotive force and no identification information is assigned to itself, it can execute process for holding identification information acquired from the power supply apparatus as that of itself, and need not execute the processes in steps S608 to S613 in the identification information receiving process. For this reason, the second power receiving apparatus stores the same identification information "1" assigned to the first and second power receiving apparatuses as that of itself. In this manner, the power supply apparatus can manage the first and second power receiving apparatuses, so that the new identification information "2" corresponds to the first power receiving apparatus, and the identification information "1" assigned to the first and second power receiving apparatuses corresponds to the second power receiving apparatus.

Therefore, when the power supply apparatus charges a plurality of power receiving apparatuses, it can prevent the same identification information from being assigned to the plurality of power receiving apparatuses, and can independently control the plurality of power receiving apparatuses.

Note that in the first embodiment, the first power receiving apparatus (camera 200) executes the identification information receiving process. However, both the first power receiving apparatus (camera 200) and the second power receiving apparatus (mobile phone 300) may execute the identification information receiving process according to the first embodiment.

In this case, when the first power receiving apparatus (camera 200) and the second power receiving apparatus (mobile phone 300) execute the identification information receiving process, the predetermined time period of the first power receiving apparatus (camera 200) is set to be different from that of the second power receiving apparatus (mobile phone 300). In this manner, even when the power supply apparatus assigns the same identification information "1" to the first and second power receiving apparatuses, it assigns new identification information "2" to the first power receiving apparatus again, and assigns new identification information "3" to the second power receiving apparatus again. This is because when the predetermined time period of the first power receiving apparatus (camera 200) is set to be equal to that of the second power receiving apparatus (mobile phone 300), the power supply apparatus unwantedly assigns the same new identification information "2" to the first and second power receiving apparatuses.

Therefore, the power supply apparatus can manage the first and second power receiving apparatuses, so that the new identification information "2" corresponds to the first power receiving apparatus, and the new identification information "3" corresponds to the second power receiving apparatus. Furthermore, when the power supply apparatus charges a plurality of power receiving apparatuses, it can prevent the same identification information from being assigned to the plurality of power receiving apparatuses, and can independently control the plurality of power receiving apparatuses.

In the description of the first embodiment, the same identification information is assigned to the first power receiving apparatus (camera 200) and the second power receiving apparatus (mobile phone 300). Alternatively, when the same identification information is assigned to two or more power receiving apparatuses, the identification information receiving process may be executed. Note that, for example, when the same identification information is assigned to three power receiving apparatuses, all of the three power receiving apparatuses may execute the identification information receiving process. In this case, assume that the predetermined time periods of these power receiving apparatuses are set to be different from each other. When the same identification information is assigned to the three power receiving apparatuses, the two power receiving apparatuses may execute the identification information receiving process, and the remaining power receiving apparatus which does not execute any identification information receiving process may store the same identification information assigned to the three power receiving apparatuses as that of itself.

When the same identification information is assigned to, for example, four power receiving apparatuses, the four power receiving apparatuses may execute the identification information receiving process, and the predetermined time periods of these power receiving apparatuses are set to be different from each other.

In the above description, note that the predetermined value N in step S607 is set to be "2". The predetermined value N can assume a value equal to or larger than "2". When the predetermined value N assumes a value equal to or larger than "2", the first power receiving apparatus acquires identification information at least twice from the power supply apparatus. Hence, even when the first power receiving apparatus acquires the same identification information as that of the second power receiving apparatus in the first reception, identification information acquired in the second or subsequent reception is more likely to be different from that of the second power receiving apparatus.

(Identification Information Delete Process)

Figure 7A:
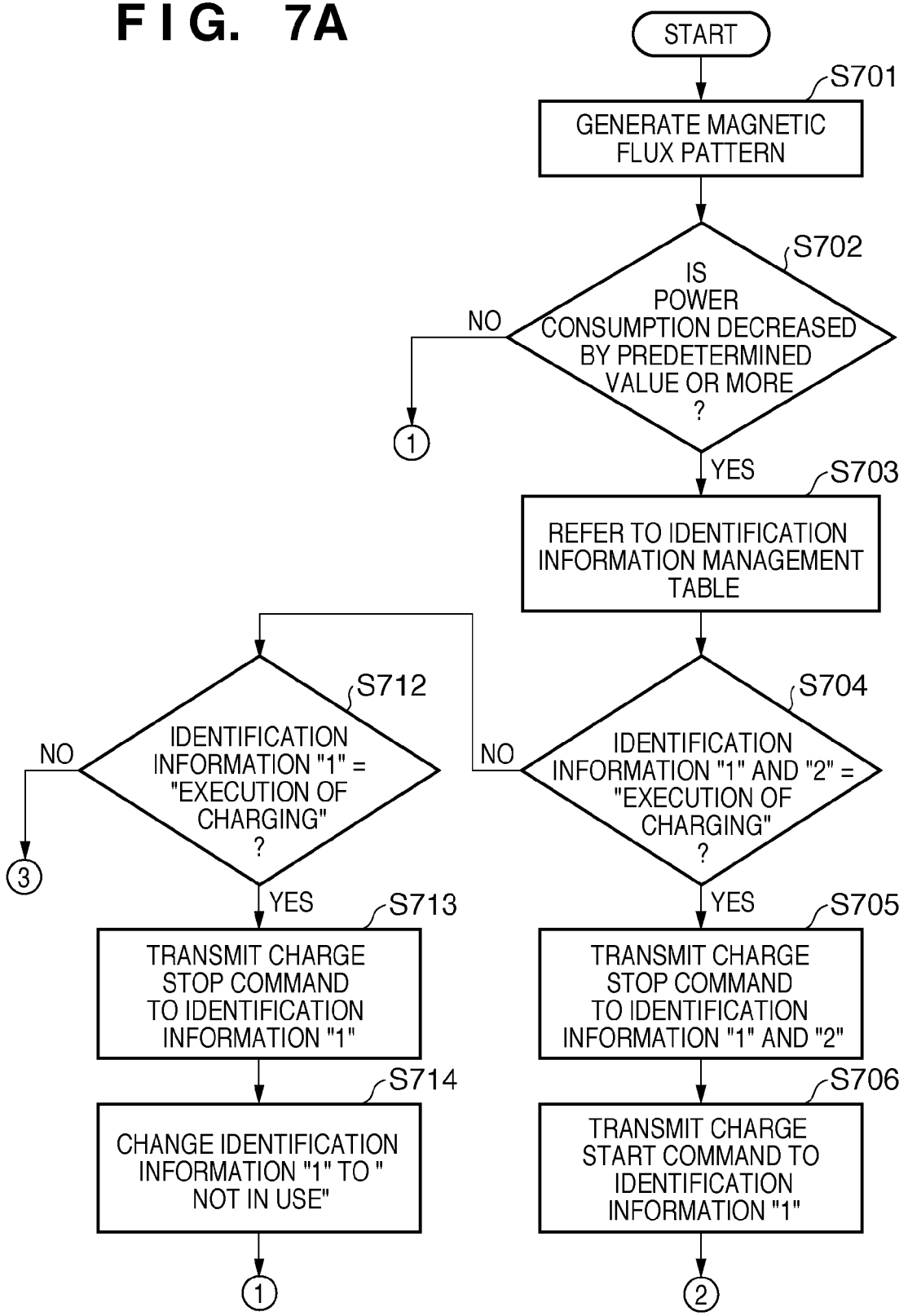
FIGS. 7A and 7B are flowcharts showing identification information delete process executed by the power supply apparatus according to the first embodiment.
Figure 7B:
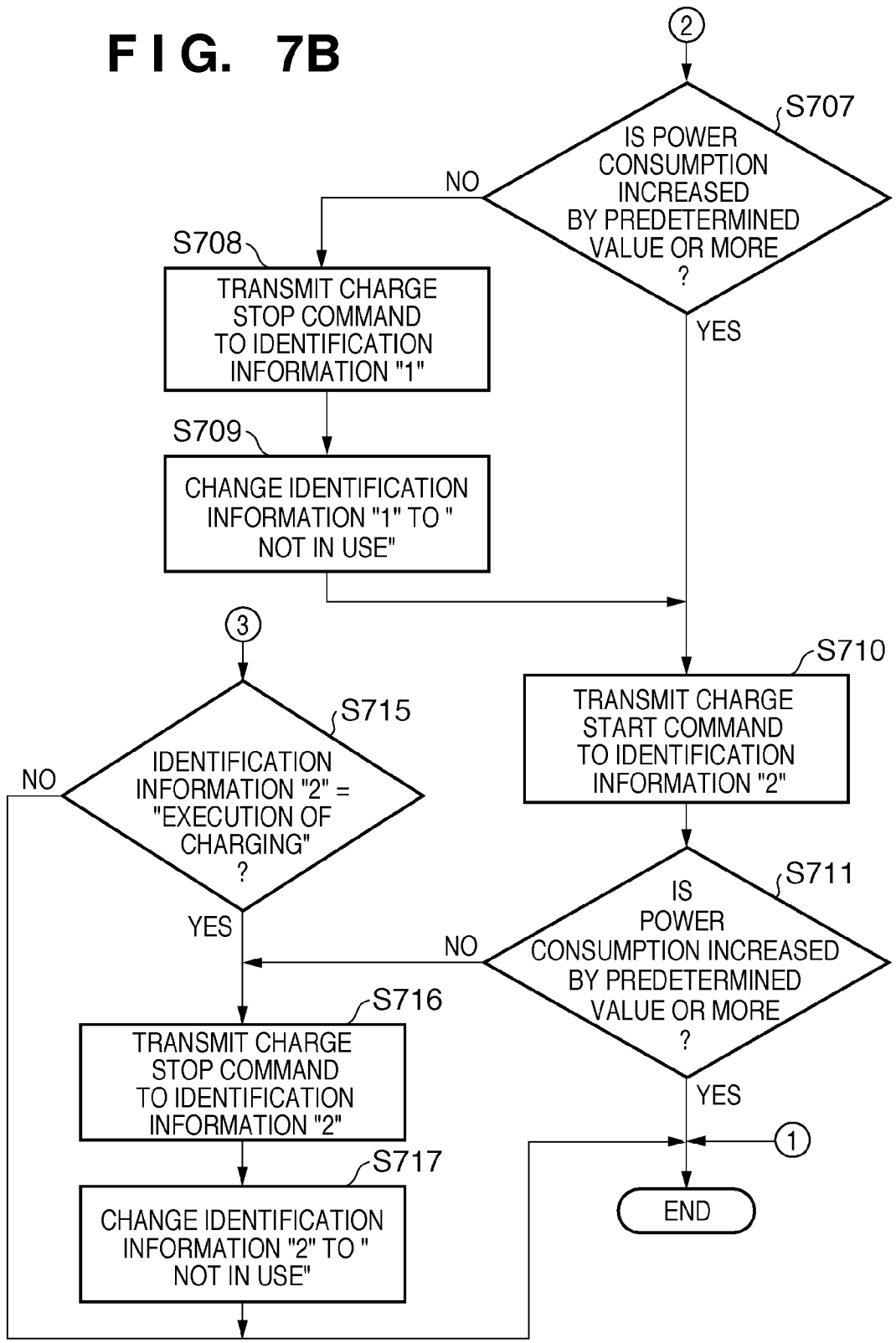

The identification information delete process executed by the power supply station 100 in the first embodiment will be described below with reference to the flowcharts of FIGS. 7A and 7B. The identification information delete process can be implemented when the control unit 105 reads out and executes a corresponding process program stored in the storage unit 106.

The identification information delete process shown in FIGS. 7A and 7B will be described below taking as an example a case in which the mobile phone 300 is removed from the power supply station 100, as shown in FIG. 1C, in a state in which the camera 200 and mobile phone 300 exist on the power supply station 100, as shown in FIG. 1B.

Note that the identification information delete process will be explained under the assumption that identification information "1" is assigned to the camera 200, identification information "2" is assigned to the mobile phone 300, and the power supply station 100 supplies in parallel electric powers to the camera 200 and mobile phone 300.

In step S701, the control unit 105 controls the resonance circuit 102 to oscillate as in step S501, thus beginning to transmit the first magnetic flux pattern from the primary coil 104. When the power transmission magnetic flux pattern is transmitted, the control unit 105 advances the process to step S702.

The control unit 105 determines in step S702 whether or not a power consumption detected by the resonance circuit 102 is decreased by a predetermined value or more.

When the power consumption detected by the resonance circuit 102 is decreased by the predetermined value or more, the control unit 105 determines that at least one of the plurality of power receiving apparatuses assigned identification information stops to charge its secondary battery using an induced electromotive force based on the first magnetic flux pattern.

When the mobile phone 300 is removed from the power supply station 100, as shown in FIG. 1C, from the state shown in FIG. 1B, the mobile phone 300 can no longer receive the first and second magnetic flux patterns from the power supply station 100. In this case, since no electromotive force is generated on the secondary coil 303 of the mobile phone 300, the mobile phone 300 can no longer charge the secondary battery.

When charging of the mobile phone 300 is complete in the state shown in FIG. 1B, since the state of the mobile phone 300 is changed to the power receiving stopped state in which charging on the secondary battery is stopped, the output rectification circuit 301 of the mobile phone 300 stops to supply a DC electric power to the charge unit 304.

When charging on the secondary battery (not shown) is stopped in the mobile phone 300, a power consumption detected by the resonance circuit 102 is decreased compared to a case in which the mobile phone 300 charges the secondary battery. Likewise, when charging on the secondary battery (not shown) is stopped in the camera 200, a detected power consumption in the resonance circuit 102 is decreased compared to a case in which the camera 200 charges the secondary battery.

When the power consumption detected by the resonance circuit 102 is decreased by the predetermined value or more, the control unit 105 determines that at least one of the power receiving apparatuses placed on the power supply station 100 is set in the power receiving stopped state or does not exist within a receiving range of the magnetic flux patterns.

Also, when neither the camera 200 nor the mobile phone 300 charges the secondary battery, the power consumption detected by the resonance circuit 102 is decreased more than a case in which one of the camera 200 and mobile phone 300 charges the secondary battery. Furthermore, when one of the camera 200 and mobile phone 300 charges the secondary battery, the power consumption detected by the resonance circuit 102 is decreased more than a case in which both the camera 200 and mobile phone 300 charge the secondary batteries.

When the control unit 105 determines that the power consumption detected by the resonance circuit 102 is decreased by the predetermined value or more, it advances the process to step S703. When the control unit 105 determines that the power consumption detected by the resonance circuit 102 is not decreased by the predetermined value or more, it ends the identification information delete process.

In step S703, the control unit 105 acquires all pieces of identification information of the power receiving apparatuses whose current charge state is "execution of charging" with reference to the identification information management table. When the control unit 105 acquires all the pieces of identification information corresponding to the power receiving apparatuses during charging, it advances the process to step S704.

The control unit 105 determines in step S704 in accordance with the pieces of identification information acquired in step S703 whether one or both of the power receiving apparatus of identification information "1" and that of identification information "2" have the charge state "execution of charging".

A power receiving apparatus which causes the control unit 105 to determine in step S702 that the power consumption is decreased by the predetermined value or more is considered as that which has a charge state "execution of charging" in the identification information management table and the state of which is changed from the power receiving state to the power receiving stopped state in response to completion of charging. That is, a power receiving apparatus which causes the control unit 105 to determine in step S702 that the power consumption is decreased by the predetermined value or more is at least one of power receiving apparatuses whose charge state in the identification management table is "execution of charging". For this reason, the control unit 105 detects a power receiving apparatus which causes the control unit 105 to determine in step S702 that the power consumption is decreased by the predetermined value or more by detecting a power receiving apparatus whose charge state in the identification information management table is "execution of charging" according to the pieces of identification information acquired in step S703.

When the control unit 105 determines that one of the charge state of one of the power receiving apparatus of the identification information "1" and that of the identification information "2" is "execution of charging", it advances the process to step S712. On the other hand, when the control unit 105 determines that the charge states of both of the apparatuses of the identification information "1" and identification information "2" are "execution of charging", it advances the process to step S705.

In step S705, the control unit 105 transmits a charge stop command for stopping charging to all the power receiving apparatuses corresponding to the identification information including the charge state "execution of charging".

The control unit 105 generates a charge stop command which includes the identification information "1" as destination identification information and a command code that instructs to stop charging. Likewise, the control unit 105 generates a charge stop command which includes the identification information "2" as destination identification information and a command code that instructs to stop charging. The charge stop command including the identification information "1" is superposed on the first magnetic flux pattern generated by the resonance circuit 102, and is transmitted to the camera 200 assigned the identification information "1". Also, the charge stop command including the identification information "2" is superposed on the first magnetic flux pattern generated by the resonance circuit 102, and is transmitted to the mobile phone 300 assigned the identification information "2".

After the control unit 105 transmits the charge stop commands to the power receiving apparatus of the identification information "1" and that of the identification information "2", it advances the process to step S706. When the camera 200 receives the charge stop command including the identification information "1", the control unit 205 changes the state of the camera 200 to the power receiving stopped state. When the mobile phone 300 receives the charge stop command including the identification information "2", the control unit 305 changes the state of the mobile phone 300 to the power receiving stopped state. Note that when the camera 200 receives the charge stop command including the identification information "1" while it is set in the power receiving stopped state, the control unit 205 holds the power receiving stopped state of the camera 200. Note that when the mobile phone 300 receives the charge stop command including the identification information "2" while it is set in the power receiving stopped state, the control unit 305 holds the power receiving stopped state of the mobile phone 300. In this case, a power receiving apparatus which is not assigned the identification information "1" does not execute any process according to the charge stop command including the identification information "1" even when it receives that charge stop command. Also, a power receiving apparatus which is not assigned the identification information "2" does not execute any process according to the charge stop command including the identification information "2" even when it receives that charge stop command.

In step S706, the control unit 105 transmits a charge start command including the identification information "1" to the plurality of power receiving apparatuses placed on the power supply station 100. The control unit 105 generates the charge start command which includes the identification information "1" as destination identification information, and a command code that instructs to start charging. The charge start command including the identification information "1" is superposed on the first magnetic flux pattern generated by the resonance circuit 102, and is transmitted to the camera 200. After the control unit 105 transmits the charge start command, it advances the process to step S707. When the camera 200 receives the charge start command including the identification information "1", the control unit 205 changes the state of the camera 200 to the power receiving state according to the remaining capacity of the secondary battery (not shown). When the camera 200 receives the charge start command including the identification information "1", and the secondary battery (not shown) is not fully charged, the control unit 205 changes the state of the camera 200 to the power receiving state. However, when the camera 200 receives the charge start command including the identification information "1", and the secondary battery (not shown) is fully charged, the control unit 205 does not change the state of the camera 200 to the power receiving state. Note that a power receiving apparatus which is not assigned the identification information "1" does not execute any process according to the charge start command including the identification information "1" even when it receives that charge start command.

The control unit 105 determines in step S707 whether or not the power consumption detected by the resonance circuit 102 is increased by a predetermined value or more. With this result, the control unit 105 checks whether or not the power receiving apparatus of the identification information "1" performs charging. When the power consumption detected by the resonance circuit 102 is increased by the predetermined value or more, the control unit 105 determines that the power receiving apparatus of the identification information "1" exists on the power supply station 100, and is charging the secondary battery. In this case, the control unit 105 advances the process to step S710. When the power consumption detected by the resonance circuit 102 is not increased by the predetermined value or more, the control unit 105 advances the process to step S708.

In step S708, the control unit 105 generates a charge stop command which includes the identification information "1" as destination identification information, and a command code that instructs to stop charging, and transmits this command to the plurality of apparatuses placed on the power supply station 100. When the charge stop command is transmitted, the control unit 105 advances the process to step S709.

In step S709, the control unit 105 changes the charge state corresponding to the identification information "1" from "execution of charging" to "not in use". In this case, the control unit 105 advances the process to step S710.

In step S710, the control unit 105 transmits a charge start command including the identification information "2" to the plurality of power receiving apparatuses placed on the power supply station 100. The control unit 105 generates the charge start command which includes the identification information "2" as destination identification information and a command code that instructs to start charging. The charge start command including the identification information "2" is superposed on the first magnetic flux pattern generated by the resonance circuit 102, and is transmitted to the plurality of power receiving apparatuses placed on the power supply station 100. When the charge start command is transmitted, the control unit 105 advances the process to step S711. When the mobile phone 300 receives the charge start command including the identification information "2", the control unit 305 changes the state of the mobile phone 300 to the power receiving state according to the remaining capacity of the secondary battery (not shown). When the mobile phone 300 receives the charge start command including the identification information "2", and the secondary battery (not shown) is not fully charged, the control unit 305 changes the state of the mobile phone 300 to the power receiving state. However, when the mobile phone 300 receives the charge start command including the identification information "2", and the secondary battery (not shown) is fully charged, the control unit 305 does not change the state of the mobile phone 300 to the power receiving state. Note that a power receiving apparatus which is not assigned the identification information "2" does not execute any process accord to the charge start command including the identification information "2" even when it receives that charge start command.

The control unit 105 determines in step S711 whether or not the power consumption detected by the resonance circuit 102 is increased by a predetermined electric power or more. With this result, the control unit 105 checks whether or not the power receiving apparatus of the identification information "2" performs charging. When the power consumption detected by the resonance circuit 102 is increased by the predetermined electric power or more, the control unit 105 determines that the power receiving apparatus of the identification information "2" is placed on the power supply station 100, and is charging the secondary battery. In this case, the control unit 105 ends the identification information delete process. When the power consumption detected by the resonance circuit 102 is not increased by the predetermined electric power or more, the control unit 105 advances the process to step S716.

The control unit 105 determines in step S712 according to the pieces of identification information acquired in step S703 whether or not the power receiving apparatus of the identification information "1" is charging the secondary battery. When the control unit 105 determines that the power receiving apparatus of the identification information "1" is charging the secondary battery, it advances the process to step S713. When the control unit 105 determines that the power receiving apparatus of the identification information "1" is not charging the secondary battery, it advances the process to step S715.

In step S713, the control unit 105 transmits a charge stop command which includes the identification information "1" as destination identification information and a command code that instructs to stop charging to the power supply apparatuses placed on the power supply station 100. After the control unit 105 transmits the charge stop command to the power receiving apparatuses placed on the power supply station 100, it advances the process to step S714.

In step S714, the control unit 105 changes the charge state corresponding to the identification information "1" in the identification information management table stored in the storage unit 106 from "execution of charging" to "not in use". After the charge state corresponding to the identification information "1" is changed in the identification information management table, the control unit 105 ends the identification information delete process.

The control unit 105 determines in step S715 based on the pieces of identification information acquired in step S703 whether or not the power receiving apparatus of the identification information "2" is charging the secondary battery. When the control unit 105 determines that the power receiving apparatus of the identification information "2" is charging the secondary battery, it advances the process to step S716. When the control unit 105 determines that the power receiving apparatus of the identification information "2" is not charging the secondary battery, it ends the identification information delete process.

In step S716, the control unit 105 transmits a charge stop command which includes the identification information "2" as destination identification information and a command code that instructs to stop charging to the plurality of power receiving apparatuses placed on the power supply station 100. After the charge stop command is transmitted, the control unit 105 advances the process to step S717.

In step S717, the control unit 105 changes the charge state corresponding to the identification information "2" in the identification information management table stored in the storage unit 106 from "execution of charging" to "not in use", and then ends the identification information delete process.

Note that the identification information assignment process and identification information delete process may be executed when a plurality of power receiving apparatuses other than the camera 200 and mobile phone 300 are placed on the power supply station 100.

For example, when three power receiving apparatuses are placed on the power supply station 100, the control unit 105 determines in step S704 whether one of the three power receiving apparatuses performs charging or two or more power receiving apparatuses simultaneously perform charging. When the control unit 105 determines that one of the three power receiving apparatuses performs charging, it advances the process to step S712. When the control unit 105 determines that the two or more power receiving apparatuses simultaneously perform charging, it advances the process to step S705.

Note that the predetermined value to be compared with the power consumption detected by the power supply station 100 in the identification information assignment process and identification information delete process can assume a value that allows to detect the camera 200 and mobile phone 300 placed on the power supply station 100. The power supply station 100 can detect that the camera 200 and mobile phone 300 are placed on the power supply station 100 by comparing a detected change in power consumption with this predetermined value. Also, the power supply station 100 can detect that the camera 200 and mobile phone 300 are removed from the power supply station 100 or that charging of the camera 200 and mobile phone 300 is complete by comparing a detected change in power consumption with this predetermined value.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-102688, filed Apr. 27, 2010, which is hereby incorporated by reference herein in its entirety.

What is claimed is:

1. An electronic apparatus comprising:
   a power receiving unit that receives power from a power supply apparatus wirelessly;
   a receiving unit that receives data from the power supply apparatus; and
   a control unit that (a) obtains first identification information from data which is received by the receiving unit, (b) performs a predetermined process to cause the power supply apparatus to transmit data, including identification information, to the electronic apparatus again after the first identification information is obtained, and (c) obtains second identification information from data, received by the receiving unit, after the first identification is obtained, and (d) stores the second identification information in a recording unit, wherein the predetermined process includes a process for changing a state of the electronic apparatus.

2. The electronic apparatus according to claim 1, wherein the control unit deletes the first identification information from the recording unit if the state of the electronic apparatus is changed after the first identification is obtained.

3. The electronic apparatus according to claim 1, further comprising:
   a count unit that detects a number of times that identification information is obtained from the power supply apparatus
   wherein the control unit performs the predetermined process until the number of times is equal to or more than a predetermined value.

4. The electronic apparatus according to claim 1, wherein the predetermined process includes a process for changing the state of the electronic apparatus from a second state to a first state, wherein the first state is a state where power to be received via the power receiving unit is supplied to a predetermined unit, and the second state is a state where power to be received via the power receiving unit is not supplied to the predetermined unit.

5. The electronic apparatus according to claim 4, wherein the predetermined process includes a process for changing the state of the electronic apparatus to the second state after the first identification information is obtained.

6. The electronic apparatus according to claim 1, wherein the predetermined process includes a process for changing the state of the electronic apparatus from a second state to a first state, wherein the first state is a state where power to be received via the power receiving unit is supplied to a battery connected to the electronic apparatus, and the second state is a state where power to be received via the power receiving unit is not supplied to the battery.

7. The electronic apparatus according to claim 6, wherein the predetermined process includes a process for changing the state of the electronic apparatus to the second state after the first identification information is obtained.

8. The electronic apparatus according to claim 1, wherein the control unit causes the power supply apparatus to detect the electronic apparatus as a new apparatus by performing the predetermined process.

9. The electronic apparatus according to claim 1, wherein the control unit causes the power supply apparatus to detect that charging of the electronic apparatus is finished by performing the predetermined process.

10. The electronic apparatus according to claim 1, wherein the control unit controls the electronic apparatus based on control data, including the second identification information, if the receiving unit receives the control data after the second identification information is stored in the recording unit.

11. The electronic apparatus according to claim 1, wherein the electronic apparatus includes at least one of a mobile phone, a player, and a camera.

12. The electronic apparatus according to claim 1, wherein the second identification information is used for controlling the electronic apparatus.

13. A control method for controlling an electronic apparatus, the control method comprising:
receiving power from a power supply apparatus wirelessly;
receiving data from the power supply apparatus;
obtaining first identification information from data which is received from the power supply apparatus;
performing a predetermined process to cause the power supply apparatus to transmit data, including identification information, to the electronic apparatus again after the first identification information is obtained, wherein the predetermined process includes a process for changing a state of the electronic apparatus;
obtaining second identification information from data which received from the power supply apparatus after the first identification information is obtained, and
storing the second identification information in a recording unit.

14. The control method according to claim 13, further comprising:
deleting the first identification information from the recording unit if the state of the electronic apparatus is changed after the first identification information is obtained.

15. The control method according to claim 13, further comprising:
detecting a number of times that identification information is obtained from the power supply apparatus, and
performing the predetermined process until the number of times is equal to or more than a predetermined value.

16. The control method according to claim 13, wherein the predetermined process includes a process for changing the state of the electronic apparatus from a second state to a first state, wherein the first state is a state where power to be received via the power receiving unit is supplied to a predetermined unit, and the second state is a state where power to be received via the power receiving unit is not supplied to the predetermined unit.

17. The control method according to claim 16, wherein the predetermined process includes a process for changing the state of the electronic apparatus to the second state after the first identification information is obtained.

18. The control method according to claim 13, wherein the predetermined process includes a process for changing the state of the electronic apparatus from a second state to a first state, wherein the first state is a state where power to be received via the power receiving unit is supplied to a battery connected to the electronic apparatus, and the second state is a state where power to be received via the power receiving unit is not supplied to the battery.

19. The control method according to claim 18, wherein the predetermined process includes a process for changing the state of the electronic apparatus to the second state after the first identification information is obtained.

20. A non transitory storage medium storing a program, wherein the program causes a computer to perform a controlling method for controlling an electronic apparatus, the method comprising:
receiving power from a power supply apparatus wirelessly;
receiving data from the power supply apparatus;
obtaining first identification information from data which is received from the power supply apparatus;
performing a predetermined process to cause the power supply apparatus to transmit data, including identification information, to the electronic apparatus again after the first identification information is obtained, wherein the predetermined process includes a process for changing a state of the electronic apparatus;
obtaining second identification information from data which received from the power supply apparatus after the first identification information is obtained, and
storing the second identification information in a recording unit.

* * * * *